UNITED STATES PATENT OFFICE.

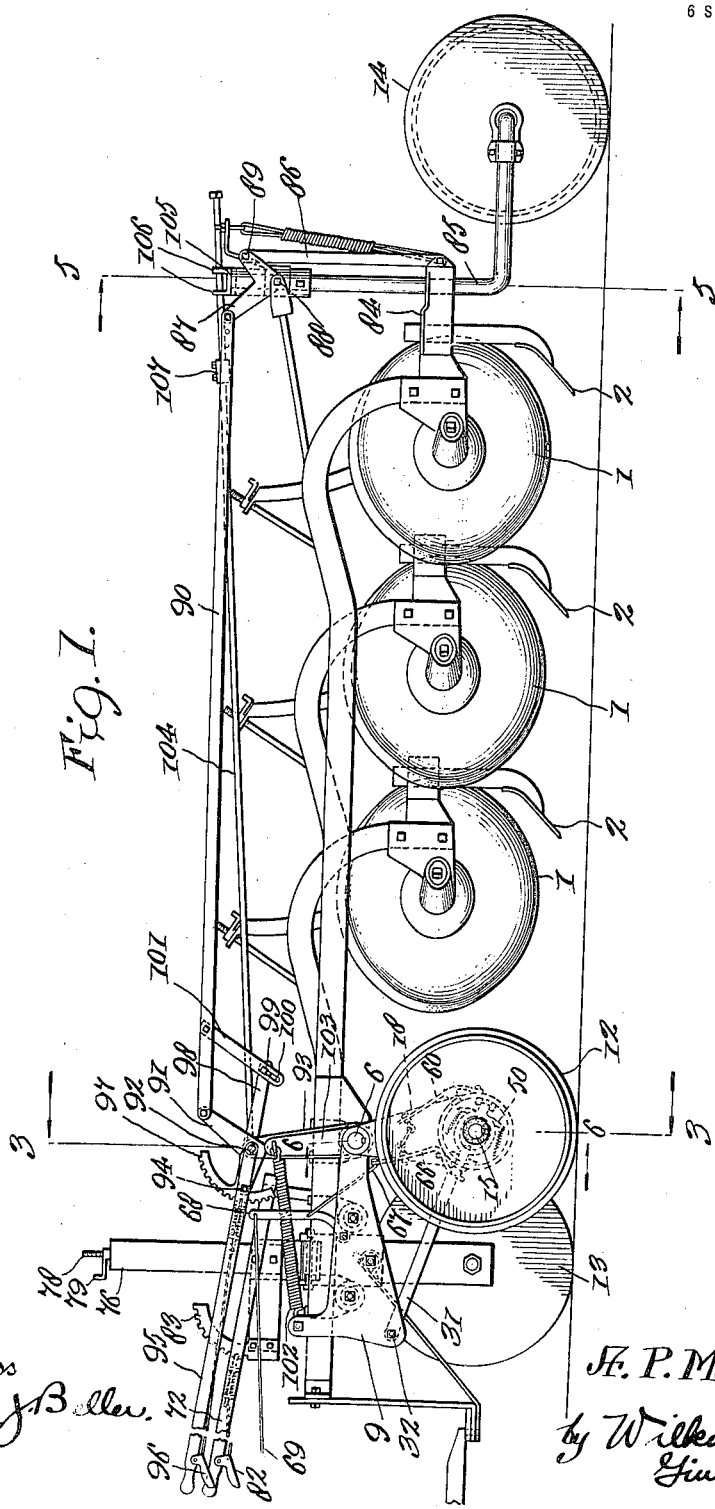

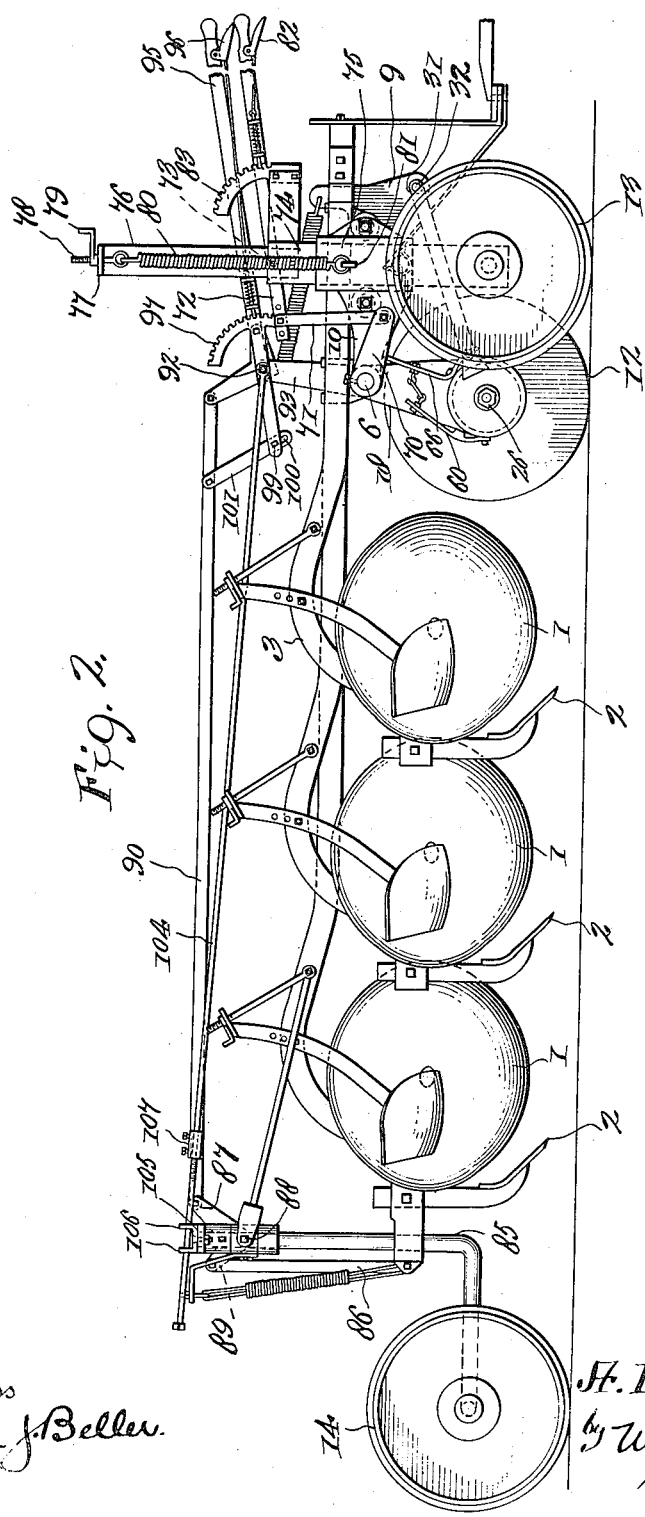

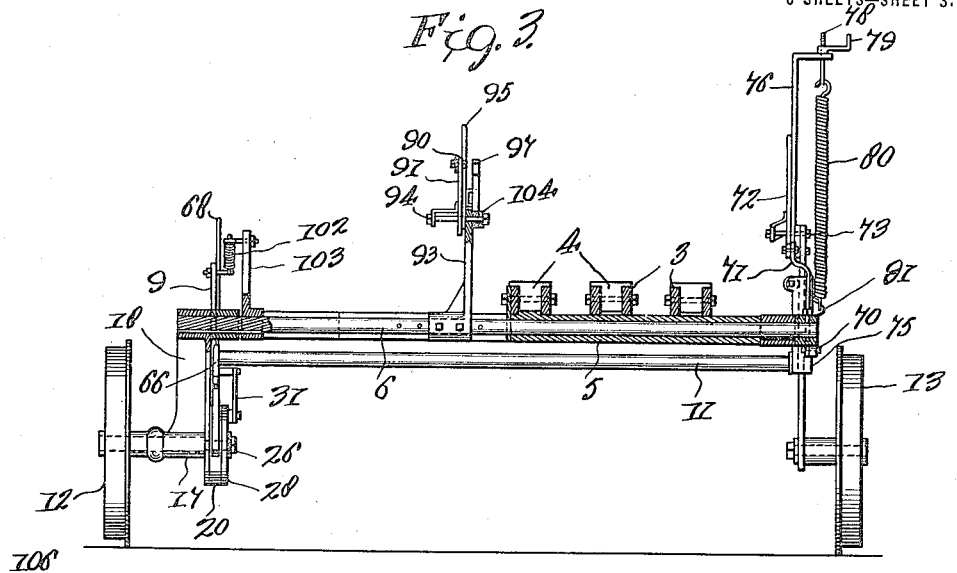

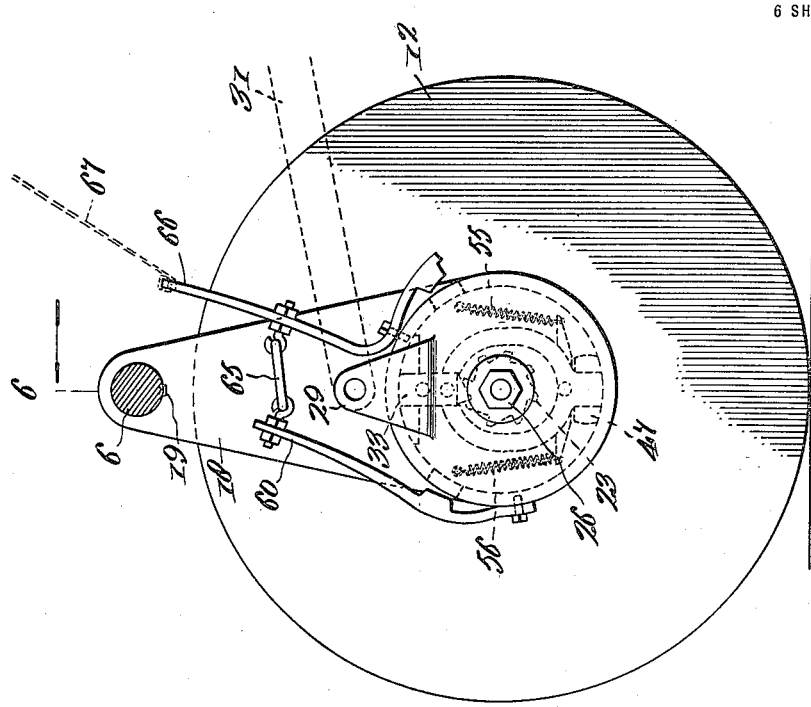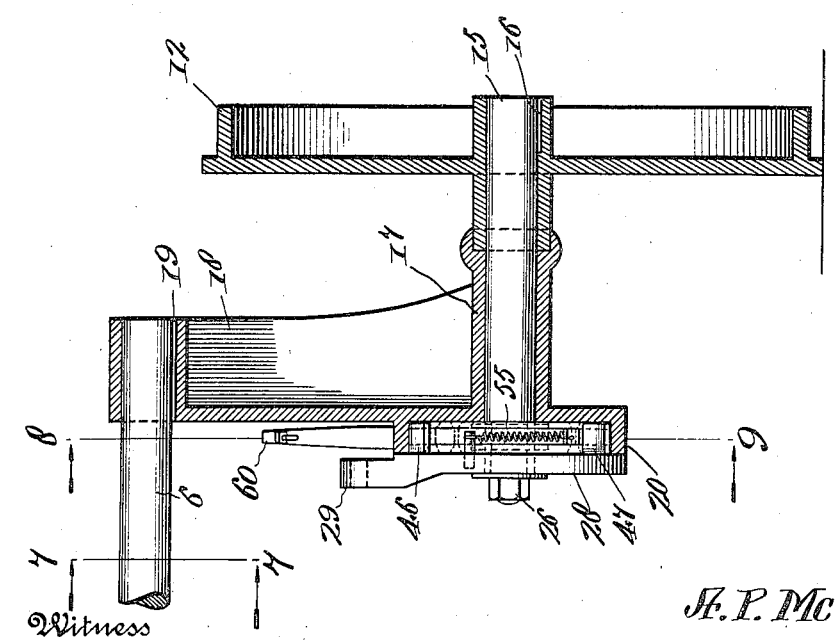

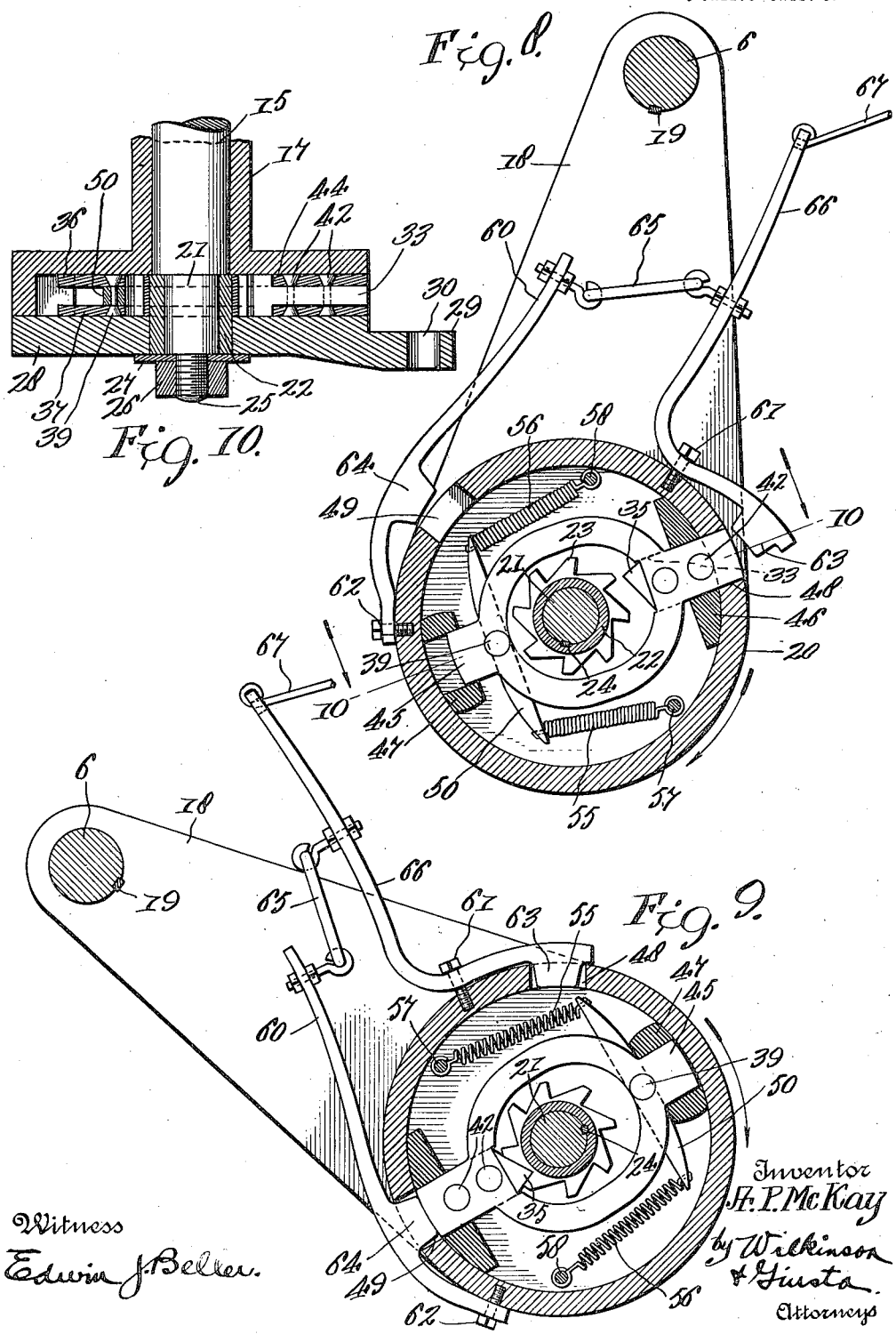

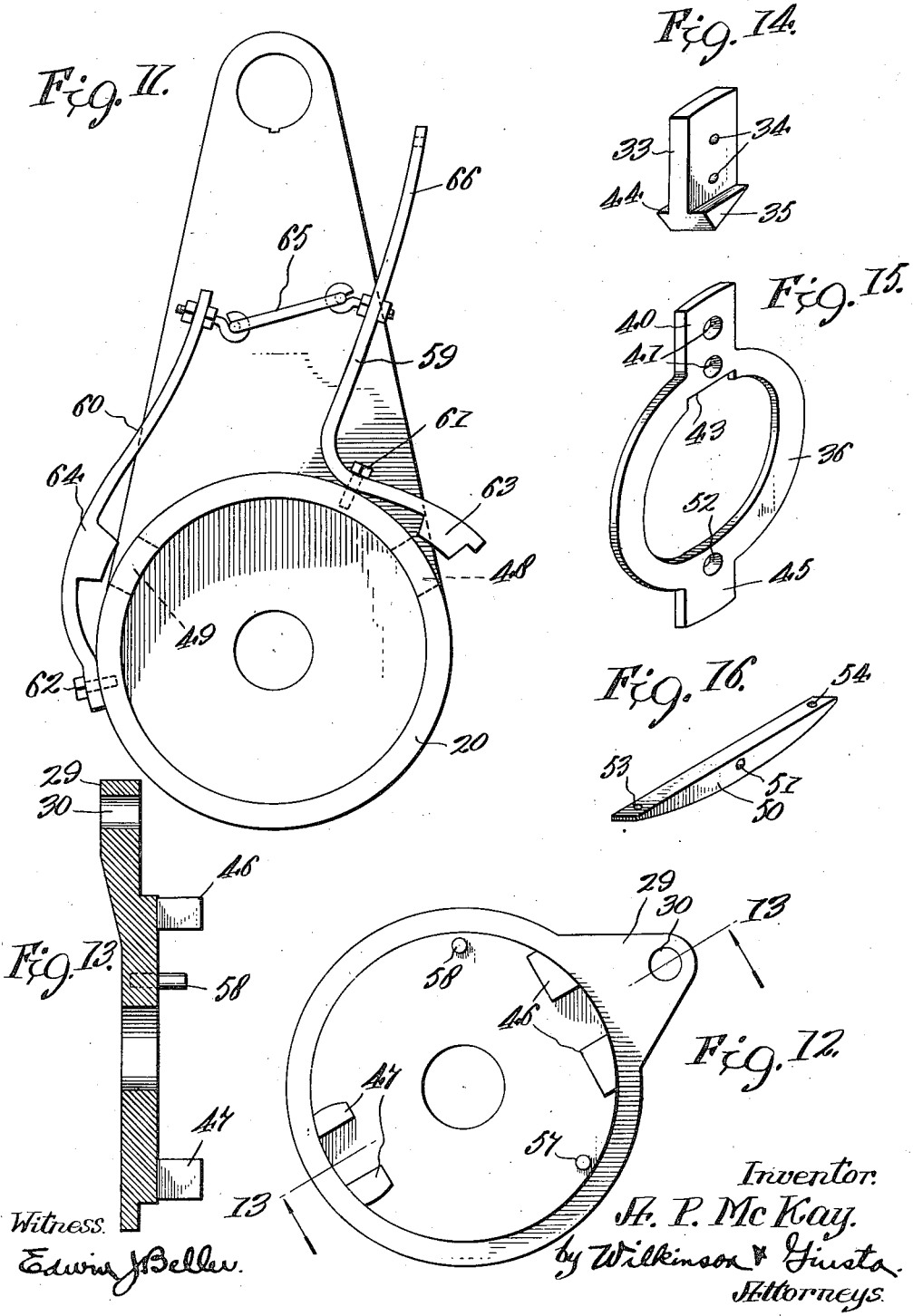

AUGUSTA POSTELLE McKAY, OF ROME, GEORGIA, ASSIGNOR TO McKAY DISK PLOW CO., OF ROME, GEORGIA, A CORPORATION OF GEORGIA.

DISK PLOW AND SUBSOILER.

1,323,887.     Specification of Letters Patent.     Patented Dec. 2, 1919.

Application filed September 12, 1918. Serial No. 253,732.

*To all whom it may concern:*

Be it known that I, AUGUSTA P. McKAY, a citizen of the United States, residing at Rome, in the county of Floyd and State of Georgia, have invented certain new and useful Improvements in Disk Plows and Subsoilers; and I do hereby declare the following to be a full, clear, and exact description of the invention, such as will enable others skilled in the art to which it appertains to make and use the same.

The present invention relates to improvements in disk plows and subsoilers, and the purpose thereof is to provide means whereby the plow frame which carries the disks and the subsoilers may be elevated and lowered both at the front and rear ends in order to raise the plows and subsoilers out of contact with the soil, or to allow same to descend into operative contact therewith.

An object of the present invention is to accomplish the above described purpose by means of an automatic lift mechanism which, after being tripped by the operator, will either raise or lower the plow frame and lock same in the shifted position.

It is also an object of the present invention to provide means for controlling the lead of the rear wheel, or, in other words, to cause the rear wheel to run at a greater or less angle to the line of draft, whereby to give the proper amount of resistance to the side thrust on the disks when they are cutting deeply into the ground.

My invention will be more fully understood after reference to the accompanying drawings, in which like parts are indicated by corresponding reference symbols throughout the several views, and in which:—

Figure 1 is a side elevational view of an apparatus constructed in accordance with the present invention.

Fig. 2 is a similar view looking at the opposite side of the apparatus.

Fig. 3 is a cross sectional view taken on the line 3—3 in Fig. 1.

Fig. 4 is a fragmentary top plan view showing the forward portion of the apparatus.

Fig. 5 is a fragmentary sectional view taken on the line 5—5 in Fig. 1.

Fig. 6 is an enlarged fragmentary sectional view of the road wheel, crank arm and associated parts, this view being taken on the line 6—6 in Fig. 7.

Fig. 7 is a cross sectional view taken on the line 7—7 in Fig. 6.

Figs. 8 and 9 are sectional views taken on the line 8—8 in Fig. 6, and showing the parts in two different positions.

Fig. 10 is a cross sectional view taken on the line 10—10 in Fig. 8.

Fig. 11 is a side elevational view of the rocking caster and connected parts, including the housing.

Fig. 12 is a similar view, showing the cap or covering for the housing.

Fig. 13 is a transverse sectional view taken on the line 13—13 in Fig. 12.

Fig. 14 is a perspective view of the clutch latch.

Fig. 15 is a similar view of one of the members of the clutch yoke; and

Fig. 16 is also a perspective view of a cross bar carried by the clutch yoke.

Referring more particularly to the drawings, 1 designates the disk plows and 2 the subsoilers which are carried by the plow beams 3. The manner in which the plows 1 and the subsoilers 2 are attached forms no part of the present invention, and is not illustrated in minute details here, nor is it further described. These parts may be mounted in the manner shown more particularly in my prior U. S. Patent No. 1,189,982, granted July 4, 1916, and entitled Improvements in disk plows.

The several plow beams 3, which are employed in any suitable number, are supported near their forward ends at the front part of the plow framework, and, as shown in Figs. 3 and 4, these plow beams 3 are preferably made up of the longitudinally divided and spaced portions or members as also referred to in my above prior patent; and the slots provided between the members of the plow beams 3 being arranged to receive blocks 4 by which the plow beams are connected to sleeves 5, which latter fit loosely about shafts 6, 7 and 8.

The shaft 6 is hereinafter called the "operating shaft," and is journaled in side plates 9 and 10, which also carry bearings in which the other shafts 7 and 8 are journaled and which form rigid parts of the plow frame.

The tie rod 11 is also preferably connected between the side plates 9 and 10 as a reinforcement for same.

The plow frame may be built up as above indicated, or it may be built up in any other appropriate manner enabling it to carry the disks and subsoilers, and such frame is supported for motion at its forward end by a road wheel 12, and a furrow wheel 13, preferably slightly offset transversely from the road wheel 12, and arranged in advance of the latter; the rear end of the plow being supported by a rear wheel 14.

The road wheel 12 is carried on an axle stud 15, which may be best seen in Fig. 6, the road wheel 12 being keyed as indicated at 16 to said stud, in order to compel the latter to revolve with the road wheel when the plow is drawn over the ground. A bearing 17, carried by a crank arm 18, is provided to receive the axle stud 15, and in such bearing the stud is adapted to revolve freely. The crank arm 18 is fixed, as by the key 19, to one end of the operating shaft 6, and is adapted to rock said shaft 6 in accordance with the rocking motion imparted to the crank arm 18, as hereinafter described.

The construction of the inner side of the crank arm 18 is probably best seen in Fig. 11, taken in connection with Fig. 6, wherein said crank arm is shown to be formed with a substantially cylindrical housing 20, concentric with the axle stud 15, which is adapted to project within such housing.

In Fig. 10, the axle stud 15 is shown to have a reduced trunnion 21, which has a part thereof passing through the center of the housing, and over such reduced trunnion 21 there is slipped a sleeve 22 that carries the ratchet teeth 23. In Figs. 8 and 9, these ratchet teeth are clearly shown, and there is also shown in these figures the key 24 that is employed to secure the trunnion 21 and the sleeve 22 to rotate together. The arrangement is such that the road wheel 12 will rotate the axle stud 15 and such axle stud will in turn transmit a rotary motion to the ratchet teeth 23. This rotary motion of the ratchet teeth will take place in a clockwise direction, as looked at from the viewpoint of Figs. 8 and 9.

The sleeve carrying the ratchet teeth 23 may be referred to as the "clutch wheel."

The axle stud 15 is also further reduced beyond the trunnion 21, as shown at 25 in Fig. 10, this further reduced portion being threaded to receive a nut 26, adapted to be tightened against a washer 27; this washer bearing up against the adjacent end of the sleeve 22 and also projecting beyond the sleeve and engaging against and holding in place a cap or cover 28, which closes the inner end of the housing 20. This cap or covering 28 is adapted to be capable of rotation with respect to the housing 20, and the same is provided with an arm 29 having a perforation 30 therein, which is adapted to receive a pin or bolt by which one end of a link 31 is connected therewith. This link is shown in Figs. 1 and 2, and in dotted lines in Fig. 7. In Figs. 1 and 2, the opposite end of the link is shown connected as by a pin or bolt 32 to the side plate 9.

The rotary motion transmitted to the clutch 22, 23 is adapted to be communicated to the cap or covering 28, and by reason of the link 31 such rotary motion will cause the crank arm 18 to be swung, and the operating shaft 6 to be correspondingly rocked.

The necessary parts to transmit motion from the clutch wheel to the cap or covering 28 will now be described. I provide a latch 33, which is adapted to move into and out of engagement with the ratchet teeth 23; this latch being carried by a yoke which is mounted to reciprocate in the housing 20. This latch 33 is shown in perspective in Fig. 14, and is preferably made up of a shank having the perforations 34 and the head 35, which is formed to correspond with the teeth 23 so that such head 35 may enter between adjoining teeth and so interlock therewith that the rotary motion of the ratchet may be caused to carry the latch 33 around therewith inside of the housing 20.

The yoke above referred to is preferably made up of two members 36 and 37, these members being shown in Fig. 10 as held spaced apart by a cross bar 50, through which passes a rivet or other fastening means 39 employed to hold the two members of the yoke together.

The two members of the yoke are alike in all respects, and one member 36 of the same is shown in perspective in Fig. 15. In this figure, the yoke member 36 is formed of an open ring, the opening being made to receive the clutch wheel. There is an extension or lug 40 on the upper part of this yoke member 36 formed with perforations 41 to receive rivets 42 shown in Fig. 10, which also pass through the perforations 34 in the shank of the latch 33 which is held between the said extensions 40 of the two yoke members.

A slot 43 is also made through the inner edge of each yoke member opposite to the extensions 40 to receive the shoulders 44 formed on the head 35 of said latch piece 33, as shown in Fig. 14. The latch 33 and yoke are therefore rigidly connected together and reciprocate as a whole.

Each clutch member is also formed with a lower extension or lug 45 projecting diametrically opposite to the upper extension or lug 40, and these oppositely projecting lugs or extensions on both of the yoke members are arranged to be slidingly received between pairs of guides 46 and 47 carried by the cover 28.

As shown in Fig. 11, and also in Figs. 8 and 9, the housing 20 has openings 48 and 49 made at suitable points therein; these openings being of a size to receive the outer ends of the latch 33, and the ends of the lugs or extensions 40 between which the latch is gripped.

A cross bar 50, shown in perspective in Fig. 16, is also clamped between the two members 36 and 37 forming the yoke, a central perforation 51 being made through the bar 50 in order to receive a rivet which also passes through perforations 52 in the lower parts of the yoke members near the lower lugs 45. The ends of the bar 50 are also perforated, as indicated at 53 and 54, to receive the ends of coil springs 55 and 56; the opposite ends of said springs being secured to pins 57 and 58 carried by the cap or cover 28.

The function of the springs 55 and 56 is to constantly draw upon the cross bar 50 and the yoke by which said cross bar is carried, with the result of projecting the outer end of the latch 33, and the outer ends of the lugs or extensions 40 of the yoke, through one or the other of the openings 48 or 49 in the housing 20 according to which of such openings is presented at the time to the latch and lugs.

There are two latch triggers 59 and 60, pivoted, as indicated at 61 and 62, on the housing 20, and carrying bosses 63 and 64 in such positions as enable them to enter, respectively, the openings 48 and 49 in said housing 20. A connection 65 is employed to secure the triggers 59 and 60 for simultaneous operation, and the trigger 59 is extended upwardly as indicated at 66, in order that it may be arranged to receive a cord 67 which passes up to the driver of the tractor in front, whereby said operator may pull the two triggers 59 and 60 when desired.

It will be noted that the bosses 63 and 64 of the two triggers are mounted, respectively, at different sides of the trigger pivot points, with the result that when the cord 67 is pulled upon, and the two triggers simultaneously operated, both bosses 63 and 64 will enter the openings 48 and 49 in the housing 20, and will be the means of forcing the latch 33 inwardly to engage with the ratchet teeth 23.

The latch triggers are to be so arranged that the bosses 63 and 64 will normally stand in a recoiled position as shown in Figs. 8 and 11, and will return to such recoiled position as soon as the cord 67 is slackened. The other position of the triggers and bosses is shown in Fig. 9, wherein the boss 64 has just thrust the latch 33 inwardly and its head 35 is in this figure shown in engagement between adjoining ratchet teeth.

When in the position shown in Fig. 9, it is obvious that the latch and yoke must rotate with the ratchet, and this motion will be also communicated to the cap or cover 28 because of the presence of the guides 46 and 47. As clearly appears from Fig. 9, the circumferential faces of these guides 46 and 47 conform to the contour of the interior circumferential wall of the housing 20, and the same form bearings on which the cap or cover 28 may be rotated with respect to said housing. The imperforate circumferential wall of the housing 20 between the two openings 48 and 49 will prevent the escape of the latch 33 from engagement with the ratchet teeth 23 until said latch arrives at the opposite opening 48, whereupon the springs 55 and 56 will act to project same through said opening, for which see Fig. 8.

When in the position last described, the latch will have again moved out of engagement with the ratchet teeth 23, so that the motion of the cap or covering 28 will be discontinued and positively arrested by the engagement of the latch 33 with the opening 48 in the housing 20. In other words, the cap or covering 28 will be locked in the new position to which it has just been shifted, and no further movement will be communicated to same, although the clutch wheel 23 still continues to rotate by reason of the motion which it is constantly compelled to receive from the road wheel 12.

Upon the next subsequent actuation of the triggers 59 and 60, through the operator's draft upon the cord 67, the boss 63 will in this instance thrust the latch 33 and yoke inwardly, and motion will again be set up in the cap or covering 28 which will continue until the latch 33 arrives, after describing a clockwise motion, at the companion opening 49, at which time the springs 55 and 56 will again come into play and cause the latch 33 to be projected therethrough and out of engagement with the ratchet 23. At each recurring tripping of the triggers the above described operations will take place, and as will be apparent the cap or covering 28 will be rotated through a partial revolution following each reëngagement of the latch 33 with the ratchet teeth 23.

As the cap or covering 28 is so caused to revolve, it will carry therewith the arm 29 which is connected to the lower end of the link 31 above referred to. As the other end 32 of this link is pivotally connected to a fixed part of the framework, the effect of the rotation given the cap or covering 28 will be to oscillate said crank arm 18 forwardly and backwardly about its center, which is the operating shaft 6.

From the positions shown in Figs. 1 and 2, the crank arm extends in substantially the vertical position in which the plow frame will be held elevated with the disks 1 and subsoilers 2 out of operative contact with the soil. When, however, the automatic lift apparatus just described has been allowed to move to its second position, with the arm 29 of the cap or covering 28 having revolved to the side opposite that shown in these Figs. 1 and 2, it is obvious that the crank arm 18 will be swung forwardly and the distance therefore from the plow frame to the periphery of the road wheel 12 in contact with the ground is diminished. This allows the plow frame to descend and the disks and subsoilers to enter the soil.

In Fig. 1 there is shown a lever 68, pivoted near the forward part of the framework and to which the cord or rod 67, which operates the triggers, is connected. A second cord or rod 69 is attached to the lever 68 for operating same, and passes up to the operator on the tractor ahead. This is the preferred arrangement.

I will now proceed to describe the mechanism by which the furrow wheel 13 on the opposite side of the forward part of the framework is also raised and lowered in accompaniment to the elevation and depression of the road wheel 12 with reference to the framework. This mechanism is also arranged to be actuated from the operating shaft 6, and turning to Fig. 2 of the drawings there is shown an arm 70 secured to oscillate with the operating shaft 6, and extending forwardly from the same. A link 71 connects the free end of said arm 70 with the rear end of a lever 72. This lever is fulcrumed, as indicated at 73, on a vertically slidable bearing 74 which passes movably through a guide bracket 75 attached to and rigid with the plow frame. The bearing 74 passes beneath said guide bracket 75 and carries the furrow wheel 13.

A post 76 is carried by and movable with the vertically slidable bearing 74; this post having an overhanging upper end 77 in which an eyebolt 78 is threaded and locked by a nut 79, equipped with a handle for facilitating the operation of same.

A spring 80 is connected between the eye bolt 78 and eye 81 carried by the guide bracket 75; the function of such spring 80 being to yieldingly force the post 76 and vertically slidable bearing 74 downwardly to hold the furrow wheel 13 in yielding contact with the soil. The tension of the spring 80 is adjustable by means of the eye bolt 78 anl lock nut 79.

It will be obvious that when the crank arm 18 is swung forwardly by the operation of the automatic mechanism heretofore described, such action will rotate the operating shaft 6 in a counter-clockwise direction as looked at from Fig. 2, and will consequently raise the arm 70, causing the lever 72 and the vertically slidable bracket 74 to be also raised, thereby lifting the furrow wheel an amount which may be made to correspond with the distance through which the road wheel 12 is elevated.

A reverse motion of the automatic lift mechanism will have the contrary effect and will cause the lowering of the furrow wheel 13.

The lever 72 carries a spring latch mechanism 82, coöperating with a notched segment 83 carried by the vertically slidable bearing 74. Independent of the automatic operation just described, the furrow wheel 13 may be made to assume any elevation by the manipulation of the lever 72, and after the adjustment has been made the latch mechanism 82 is made in the usual manner to reëngage with the segment 83 and lock the parts in the position so adjusted.

In accordance with the present invention, the bracket 84, which holds the rear subsoil plow, is extended and perforated, so that the same may slide vertically on the post 85 that carries the rear wheel 14. This post 85 is also capable of revolving in the opening through the bracket 84. The rear end of this bracket 84 is pivotally connected to the lower end of a link 86, by which said bracket is supported.

One arm of a bell crank lever 87, fulcrumed as shown at 88, and supported from the post 85, is pivotally connected to the upper end of said link 86, as indicated at 89. The other arm of the bell crank lever 87 is adjustably or otherwise coupled to a forwardly-running, horizontally-extending link 90, having its forward end connected to an arm 91 of a bell crank lever which is pivoted at 92 in the upper end of an arm 93, which is secured to oscillate with the operating shaft 6, and is placed substantially centrally of the same.

The forwardly-extending arm of the bell crank lever 91 is secured, as indicated at 94, to a part of a lever 95 in advance of the pivot point of the lever, which is the same point 92 about which the bell crank lever 91 rocks.

A latch mechanism 96, carried by the lever 95, is adapted to coöperate with the segmental rack 97, in order to hold the lever in the adjusted position. By swinging the lever up or down, the bell crank lever 91 may be correspondingly moved to shift the rear bracket 84, and the disk and subsoiler carried thereby, into the desired raised or lowered position. The action of raising this bracket 84 and the plow and subsoiler carried thereby is also effected automatically whenever the operating shaft 6 is revolved by the lift mechanism hereinbefore described.

The segmental rack 97 is carried on an arm 98, also fulcrumed on the same pivot point 82, with the lever 95, and bell crank lever 91. A pin 99 on the rear end of this arm 98 engages through a slot 100 in the lower end of a bar 101, which is secured to and depends from the horizontally running link 90. The purpose of this link 101, and its connection to the rack 97, is to cause said rack to swing in unison with the lever 95 upon the automatic operation of these parts.

The function of the slot 100 and the pin 99 is to provide a loose connection between the arm 98 and the bar 101 so that said arm 98 may oscillate in a vertical direction about said pivot, while bar 101 may at the same time oscillate on its pivotal connection with the link 90; the oscillating movements of the arm 98 and bar 101 being at substantially right angles.

Whenever the road wheel 12, and crank arm 18, is swung forwardly the arm 93 will, of course, be swung rearwardly. This action of the arm 93 will carry the bell crank lever 91 with it to the rear, pushing upon the horizontally-running link 90 and causing the bell crank lever 87 at the rear to be rocked, and the vertical link 86 to be forced downwardly, carrying before it the bracket 84 and rear plow and subsoiler.

When the road wheel and rocking caster are again returned to the rearward position, the opposite results are obtained, and the rear plow and subsoiler are therefore elevated.

The spring 102, which is connected between the side plate 9 and the arm 103 on the operating shaft 6, is merely to take up loose play in this shaft 6, and to place a tension on this locking motion.

The following description now refers to the device for controlling the lead of the rear wheel 14.

This device consists in a rod 104 which runs longitudinally of the framework above the plows, and near the horizontally running link 90; this rod 104 having its forward end pivoted on the point 92 about which the bell crank lever 91 rocks. The rear post 85 carries an arm 105 projecting horizontally therefrom, and rotating in a horizontal direction therewith. This post carries eyes 106 through which the rear end of the rod 104 loosely engages and slidably passes. The eyes 106 are pivoted on the arm 105, as shown in Fig. 5.

A collar 107 is adjustably fitted over the rear part of the rod 104 and may be set thereon at a desired position with respect to the forward eye 106, as by means of one or more set screws.

The operation of this device is substantially as follows:—

When the road wheel 12 and rocking crank arm 18 are swung forwardly, the arm 93 carried by the operating shaft 6 is swung rearwardly, the rod 104 is also shifted to the rear and the collar is set to engage the forward eye 106 at such a point as will strike said eye 106 and cause the swinging of the arm 105 and post 85. When the post 85 is so swung, the wheel 14 will be carried thereby at the desired angle to the line of draft, and will offer the proper amount of resistance to the side thrust of the disks when they are cutting deeply into the ground.

The amount of this angular shifting of the rear wheel 14 is, of course, controlled by the position of the adjustably mounted collar 107. When, of course, the framework is elevated by the restoration of the road wheel 12 to the position shown in Figs. 1 and 2, the rod 104 will again be drawn forwardly to remove the collar 107 from engagement with the forward eye 106, and the rear wheel 14 may then trail and swivel freely either to the right or left.

It will be obvious that various modifications might be made in the herein described construction, and in the combination and arrangement of parts which could be used without departing from the spirit of my invention; and I do not mean to limit myself to such details except as particularly pointed out in the claims.

Having thus described my invention what I claim and desire to secure by Letters Patent of the United States is:—

1. In combination with a framework, a beam carried at its forward end by the framework, and a tillage implement supported at the rear end of said beam, of a lift mechanism for the rear end of said beam, an automatic lift mechanism for said framework, a bell crank lever movable with said automatic lift mechanism and also adapted to swing about a fulcrum independent of the motion received from said automatic lift mechanism, means connecting one arm of said bell crank lever with the lift mechanism at the rear of said beam, and means associated with the other arm of said bell crank lever whereby the same may be made to pivot about its own fulcrum for operating the rear lift mechanism independently of said automatic lift mechanism, substantially as described.

2. A plow of the character described including front and rear lift mechanisms, a bell crank lever adapted to be swung by said front lift mechanism and also to have an independent oscillating movement about its own fulcrum, means connecting one arm of said bell crank lever with the rear lift mechanism, a lever pivoting about the same fulcrum with said bell crank lever and connected to the other arm of said bell crank lever whereby to oscillate the same independently of said front lift mechanism, and latch means for holding said levers in the adjusted position, substantially as described.

3. A plow of the character described including front and rear lift mechanisms, a bell crank lever adapted to be moved back and forth by said front lift mechanism and also having a pivotal movement of its own independently of the back and forth movement derived from said front lift mechanism, means for connecting one arm of said bell crank lever to the rear lift mechanism whereby the latter may be operated in accompaniment to the front lift mechanism, a hand lever also moving back and forth with said front lift mechanism and pivoted to swing on the same fulcrum with the bell crank lever, said hand lever being connected to the other arm of said bell crank lever, a notched segment also pivoted to swing about a center coincident with the fulcrum of said bell crank lever, and a latch carried by said hand lever and adapted to engage with said notched segment to hold the hand lever in adjusted position, substantially as described.

4. A plow of the character described including front and rear lift mechanisms, the front lift mechanism including an operating shaft, an arm connected to oscillate with said shaft, a bell crank lever fulcrumed on said arm, means for connecting one arm of said bell crank lever to the rear lift mechanism, a hand lever adapted to swing about the same center with said bell crank lever and connected to the other arm thereof, a notched segment also pivoted to move about the same center with said bell crank lever, a latch carried by said hand lever and coöperating with said notched segment to lock the lever in adjusted position, and means for causing the swing of said notched segment, substantially as described.

5. A plow of the character described including front and rear lift mechanisms, the front lift mechanism including an operating shaft, an arm upstanding from said operating shaft and oscillating therewith, a bell crank lever fulcrumed on the upper end of said arm, a link connecting one arm of said bell crank lever with the rear lift mechanism, a hand lever fulcrumed to swing about the same center with said bell crank lever and connected to the other arm thereof, a latch carried by said hand lever, a notched segment arranged to be engaged by said latch and also pivoted to swing about the same center with said bell crank lever, an arm projecting to the opposite side of the pivot point of said notched segment and connected to operate the same, a bar connected to said link near the bell crank lever, and a loose connection between said bar and said last named arm, substantially as described.

AUGUSTA POSTELLE McKAY.